(12) United States Patent
Luong

(10) Patent No.: US 11,513,995 B2
(45) Date of Patent: Nov. 29, 2022

(54) SYSTEM AND METHOD FOR GENERATION OF CONFIGURATION DESCRIPTORS FOR A CHIPSET

(71) Applicant: Dell Products L.P., Round Rock, TX (US)

(72) Inventor: Anh Dinh Luong, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/389,162

(22) Filed: Jul. 29, 2021

(65) Prior Publication Data
US 2021/0357355 A1 Nov. 18, 2021

Related U.S. Application Data

(63) Continuation of application No. 16/400,715, filed on May 1, 2019, now Pat. No. 11,106,624.

(51) Int. Cl.
*G06F 15/78* (2006.01)
*G06F 13/40* (2006.01)
*G06F 9/4401* (2018.01)
*G06F 13/38* (2006.01)

(52) U.S. Cl.
CPC ........ *G06F 15/7871* (2013.01); *G06F 9/4401* (2013.01); *G06F 9/4411* (2013.01); *G06F 13/385* (2013.01); *G06F 13/4081* (2013.01)

(58) Field of Classification Search
CPC ........ G06F 8/65; G06F 9/4403; G06F 9/4411; G06F 13/00; G06F 13/382; G06F 13/385; G06F 13/387; G06F 13/4081; G06F 15/177; G06F 15/7867; G06F 15/7871
See application file for complete search history.

(56) References Cited

U.S. PATENT DOCUMENTS

| | | |
|---|---|---|
| 6,636,962 B1 | 10/2003 | Sun et al. |
| 7,502,803 B2 | 3/2009 | Culter et al. |
| 2002/0099980 A1 | 7/2002 | Olarig |
| 2004/0243534 A1 | 12/2004 | Culter et al. |
| 2006/0112210 A1 | 5/2006 | Tseng |
| 2006/0136611 A1 | 6/2006 | Futral et al. |
| 2009/0006708 A1* | 1/2009 | Lim .................... G06F 13/4022 710/314 |
| 2010/0100657 A1 | 4/2010 | Ji et al. |

(Continued)

*Primary Examiner* — Thomas J. Cleary
(74) *Attorney, Agent, or Firm* — Joseph Mencher

(57) ABSTRACT

A method is provided to generate a configuration descriptor for a chipset in a computing unit. The method includes determining, by one or more processors, a plurality of desired interface configurations for the chipset and for each of the one or more desired interface configurations, determining one or more ports of the chipset and corresponding platform connectors that satisfy features of the each of the one or more of the desired interface configurations based on a chipset description and a platform description. The method further includes assigning a port from among the determined one or more ports to the each of the one or more of the desired interface configurations and generating a chipset configuration descriptor based on the assigning of ports to each of the one or more desired interface configurations. In some embodiments, the chipset is initialized based on the configuration descriptor.

20 Claims, 9 Drawing Sheets

(56) References Cited

U.S. PATENT DOCUMENTS

| | | |
|---|---|---|
| 2012/0198110 A1 | 8/2012 | Wang et al. |
| 2017/0090949 A1* | 3/2017 | Arms ................. G06F 13/4282 |
| 2018/0060268 A1 | 3/2018 | Klein |
| 2019/0370011 A1 | 12/2019 | Liu et al. |

* cited by examiner

Chipset description table 200

| Row. Num. | Silicon type 204 | Enable status 206 | Port ID 208 | Port Type 210 | Global Lane offset 212 | Dev. Num. 214 | Func. Num. 216 | Bifurcation support 218 | Hotplug support 220 | Power capability (W) 222 | *others 226 |
|---|---|---|---|---|---|---|---|---|---|---|---|
| 1 | AMD | True | PortId_01 | PCIe\| Sata \| Glink | 0 | 5 | 1 | 1x16 \| 2x8 \| 4x4 \| 2x4x8 | True | 75 | |
| 2 | AMD | False | PortId_02 | PCIe\| Sata | 16 | 3 | 2 | 1x16 \| 2x8 | False | 70 | |
| 3 | AMD | True | PortId_03 | PCIe\| Sata \| Glink | 32 | 3 | 2 | 4x4 \| 2x4x8 | True | 75 | |
| 4 | AMD | True | PortId_04 | PCIe\| Sata | 48 | 3 | 3 | 4x4 \| 2x4x8 | False | 75 | |

FIG. 2

Platform description table 300

| Row. Num. | Silicon ID 304 | Connector ID 306 | Lane offset 308 | Lanes 310 | Connector type 314 | Chipset port ID 316 | Connector hotplug support 318 | Connector power capability (W) 320 | *others 322 |
|---|---|---|---|---|---|---|---|---|---|
| 1 | 1 | CON-A | 0 | 16 | Glink | PortId_01 | True | 75 | |
| 2 | 1 | CON-B | 8 | 8 | PCIe | PortId_03 | False | 70 | |
| 3 | 1 | CON-C | 0 | 8 | SATA | PortId_04 | True | 75 | |
| 4 | 1 | CON-D | 4 | 8 | PCIe | PortId_02 | True | 80 | |

Desired interface configuration table 400

| Col. Num. | Port Type 410 | Lane count 414 | Hotplug support 416 | Lane offset 418 | Lane width 420 | BayId ID 422 | *others 424 |
|---|---|---|---|---|---|---|---|
| 1 | Glink | 16 | 1 | 0 | 16 | 00 | |
| 2 | PCIe | 04 | 1 | 0 | 4 | 01 | |
| 3 | PCIe | 04 | 1 | 4 | 4 | 01 | |
| 4 | PCIe | 04 | 1 | 8 | 4 | 01 | |
| 5 | PCIe | 04 | 1 | 12 | 4 | 01 | |

Desired interface configurations versus the platform connector and port combinations table 500

| Col. Num. | Type 502 | PortId_01/ CON-A 504 | PortId_03/ CON-B 506 | PortId_02/ CON-C 508 | PortId_04/ CON-D 510 |
|---|---|---|---|---|---|
| | | platform connector and port combination | | | |
| 1 | Glink | True | False | False | True |
| 2 | SATA | False | True | False | False |
| 3 | PCIe | True | False | False | False |

Desired interface configuration

FIG. 5

Chipset configuration descriptor 600

Header 602a

| Row. Num. | Socket ID 604 | Table Size 606 | Table Signature 608 | *others 610 |
|---|---|---|---|---|
| 1 | AMD | 26436 | 9260040356 | |

Port details 602b

| Row. Num. | Port number 610 | Port Type 612 | Hotplug support 614 | Start Lane 616 | End Lane 618 | Enable status 620 | Dev. Num. 622 | Func. Num. 624 | *others 626 |
|---|---|---|---|---|---|---|---|---|---|
| 1 | PortId_01 | Glink | 1 | 0 | 15 | 1 | 5 | 1 | |
| 2 | PortId_04a | PCIe | 1 | 0 | 3 | 1 | 3 | 2 | |
| 3 | PortId_04b | PCIe | 1 | 4 | 7 | 1 | 3 | 2 | |
| 4 | PortId_04c | PCIe | 1 | 8 | 10 | 1 | 3 | 2 | |
| 5 | PortId_04d | PCIe | 1 | 11 | 15 | 1 | 3 | 2 | |

SYSTEM AND METHOD FOR GENERATION OF CONFIGURATION DESCRIPTORS FOR A CHIPSET

CROSS-REFERENCE TO RELATED APPLICATIONS

The present disclosure is a continuation of U.S. patent application Ser. No. 16/400,715, filed on May 1, 2019, the disclosure of which is incorporated by reference herein in its entirety.

BACKGROUND

The present disclosure relates generally to an information handling system, and more particularly to a method for generation of a configuration descriptor for a chipset in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as for example, servers include a boot system that operates to perform boot operations to initialize a chipset in the server. In some examples, a boot system in a server may include a processor that is coupled to one or more memories. In some examples, the one or more memories may include an non-volatile memory express (NVMe) storage, serial peripheral interface read-only memory (SPI ROM), and/or the like that store a static built-in chipset table and a basic input output system (BIOS). Typically, the BIOS receives the static built-in chipset configuration descriptor from the memory at runtime. The static built-in chipset table includes port configurations of the chipset specific to that server model (e.g., platform) and may not be suitable to initialize the chipset on other platforms. The static built-in chipset table may also not be suitable to update and/or change the port configurations of the chipset on that server model.

Accordingly, it is desirable to provide a configuration descriptor for a chipset that is usable for different platforms and different situations.

SUMMARY

The following summary introduces certain aspects of the inventive subject matter in order to provide a basic understanding. This summary is not an extensive overview of the inventive subject matter, and it is not intended to identify key or critical elements or to delineate the scope of the inventive subject matter. Although this summary contains information that is relevant to various aspects and embodiments of the inventive subject matter, its sole purpose is to present some aspects and embodiments in a general form as a prelude to the more detailed description below.

Consistent with some embodiments, a method is provided to generate a configuration descriptor for a chipset in a computing unit. In some embodiments, the method includes receiving, by one or more processors, a plurality of desired interface configurations for the chipset, identifying each of the plurality of the desired interface configurations. The method further includes for each respective one of the plurality of the desired interface configurations, determining one or more ports of the chipset and corresponding platform connectors of the computing unit that satisfy features of the respective desired interface configuration based on a chipset description and a platform description. The method further comprises assigning a port from among the determined one or more ports to the respective desired interface configuration. The method further comprises generating a chipset configuration descriptor based on the assigning of ports to each of the one or more desired interface configurations.

Consistent with some embodiments, a system is provided to generate a configuration descriptor for a chipset in a computing unit. In some embodiments, the system includes a memory and one or more processors coupled to the memory and configured to execute instructions to cause the system to perform operations. The operations include receiving, by one or more processors, a plurality of desired interface configurations for the chipset and identifying each of the plurality of the desired interface configurations. The operations further include for each respective one of the plurality of the desired interface configurations, determining one or more ports of the chipset and corresponding platform connectors of the computing unit that satisfy features of the respective desired interface configuration based on a chipset description and a platform description, assigning a port from among the determined one or more ports to the respective desired interface configuration, and generating a chipset configuration descriptor based on the assigning of ports to each of the one or more desired interface configurations.

These and other aspects of the present disclosure will be more readily apparent from the detailed description of the embodiments set forth below taken in conjunction with the accompanying drawings.

BRIEF DESCRIPTION OF THE DRAWINGS

FIG. 2 illustrates a simplified chipset description table according to some embodiments.

FIG. 3 illustrates a simplified platform description table according to some embodiments.

FIG. 4 illustrates a simplified desired interface configuration table according to some embodiments.

FIG. 5 illustrates a simplified desired interface configurations versus platform connector and port combinations table, according to some embodiments.

FIG. 6 illustrates a simplified chipset configuration descriptor, according to some embodiments.

In the figures, elements having the same designations have the same or similar functions.

DETAILED DESCRIPTION

In the following description, specific details are set forth describing some examples consistent with the present disclosure. It will be apparent, however, to one skilled in the art that some examples may be practiced without some or each of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Figure 1:
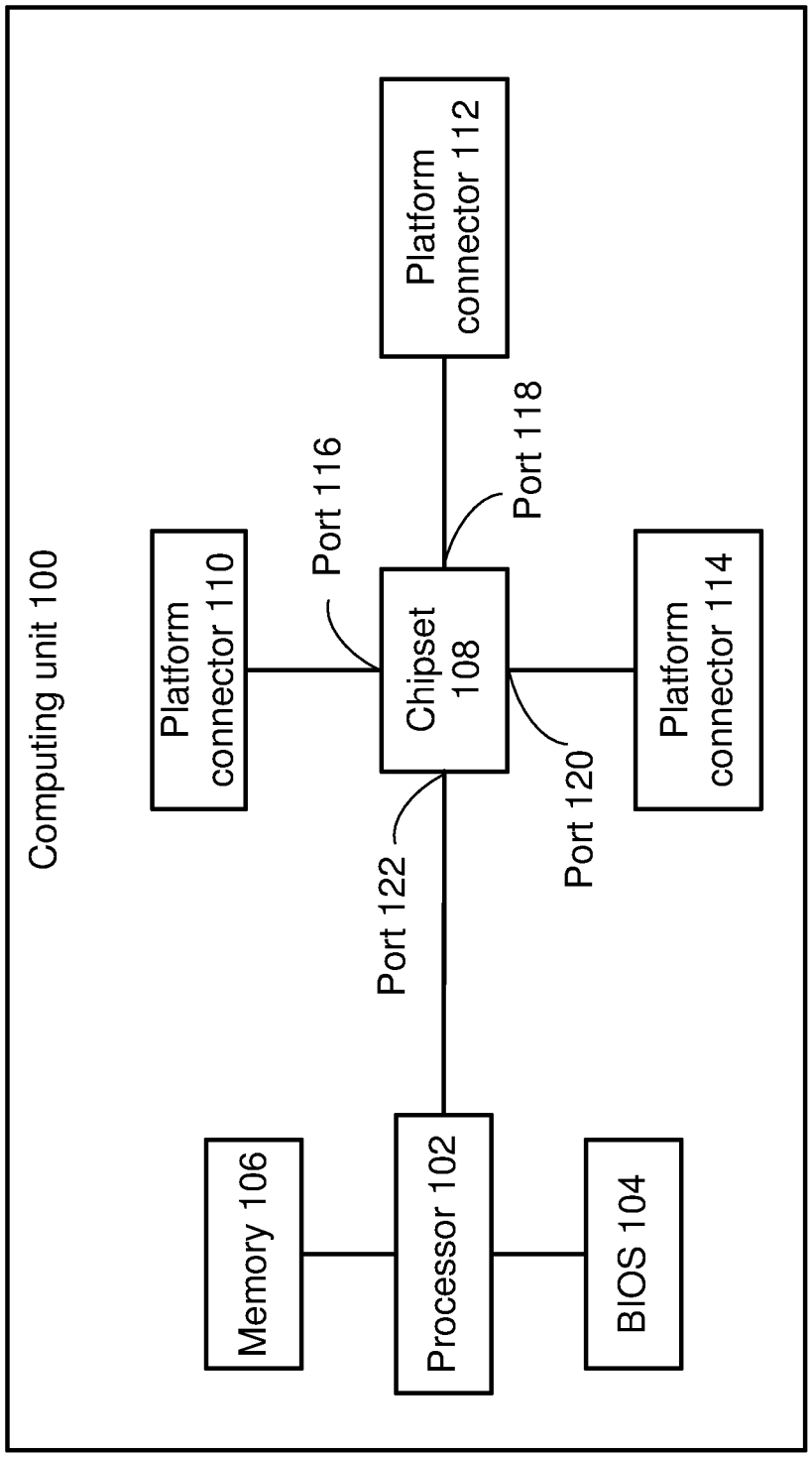
FIG. 1 illustrates a simplified block diagram of a computing unit according to some embodiments.

FIG. 1 illustrates a simplified block diagram of a computing unit 100 according to some embodiments. According to some embodiments, computing unit 100 may be a part of an information handling system. In some examples, computing unit 100 may be part of a server, a router, a network switch, a telecommunication equipment, and/or the like. As shown in FIG. 1, computing unit 100 includes a processor 102, a memory 106, platform connectors 110, 112, and 114, and a chipset 108 that includes ports 116, 118, 120, and 122. In some examples, computing unit 100 may include additional chipsets, processors, memories, platform connectors, etc. As further shown in FIG. 1, a BIOS 104, memory 106 and chipset 108 are coupled to processor 102.

In some examples, chipset 108 typically includes a set of electronic components in an integrated circuit that controls and/or manages data flow between processor 102, memory 106, platforms connectors 110, 112, and 114, etc. via ports 116, 118, 120, and 122. In some examples, chipset 108 is designed to work with a specific family of chipsets and/or processors from specific vendors (e.g., AMD®, Intel®, etc.) and may be integrated together as a System on Chip (SoC). In some examples, chipset 108 may be configured differently to work with different platforms. In some examples, platforms may be a motherboard, a blade, and/or the like on a server (e.g., computing unit 100). In some examples, different chipsets may have a different number of ports. In some examples, chipset 108 may include additional ports or a subset of the illustrated ports.

Chipset 108 is dynamically initialized at run-time. In some embodiments, chipset 108 is dynamically initialized by a chipset initialization procedure using a chipset descriptor. In some examples, the chipset initialization procedure may be stored in one or more system components such as BIOS 104 and/or the like. When the chipset initialization code is executed by processor 102, chipset 108 is initialized by BIOS 104. According to some embodiments, when the chipset initialization procedure is executed, BIOS 104 receives information about chipset 108, the ports of chipset 108, and platform connectors 110, 112, and 114 and desired interfaces for chipset 108 that may be used to initialize chipset 108. In some examples, BIOS 104 receives this information in the form of tables, such as a chipset description table, a platform description table, a desired interface configuration table, and/or the like. In some examples, BIOS 104 receives these tables from one or more system components such as processor 102, memory 106, chipset 108, etc., and/or external devices such as complex programmable logic device (CPLD), a platform management controller (BMC), and/or the like. In some examples, these tables include, but are not limited to, characteristics of a physical layer that lanes of each port of chipset 108 are coupled to (e.g., SATA, PCIe, Glink, Ethernet, etc.), bifurcation of each port of chipset 108 (1×16, 2×8, 4×4, 8×2, etc.), power management states, capabilities (e.g., speed and hotplug, etc.), platform connectors, input/output (I/O) devices, and/or the like. In some examples, BIOS 104 receives these tables via an application programming interface (API) through buses, wires, transmission lines, and/or the like.

A physical connection between a component and a port of chipset 108 is commonly referred to as a link. A port of chipset 108 is an interface on chipset 108 that may be used to communicate with one or more devices external to chipset 108. Ports 116, 118, 120, and 122 are coupled to communication channels used to transfer data between chipset 108, processor 102, memory 106, platforms connectors 110, 112, and 114, etc. In some embodiments, each of ports 116, 118, 120, and 122 may have 16 lanes. Typically, each lane includes two pairs of channels, one to send data and one to receive data. Hence, each lane is a full-duplex connection. In some embodiments, one or more lanes of each of ports 116, 118, 120, and 122 may be used to establish data communication between chipset 108 and an end-point device. In some examples, an end-point device may be a memory, a platform connector, a graphics card, an audio card, an Ethernet card, etc. In some examples, each port may be configured to support different widths to facilitate different bandwidths or speeds for data communication. For example, a port that includes a single lane is called an ×1 port, a port that includes two lanes is called an ×2 port and a port that includes four lanes is called an ×4 port, respectively. In some examples, a port may be configured to support different widths, such as ×1, ×2, ×4, ×8, ×12, ×16, ×32, and/or the like, to meet the different bandwidth requirements of various end-point devices. Thus, a dedicated bus may be 1-lane, 2-lane, 4-lane, 8-lane, 12-lane, 16-lane, 32-lane, and/or the like wide. In some embodiments, a port on chipset 108 may be configured to be bifurcated to communicate with multiple end-point devices concurrently. A port bifurcation may be a factor in determining the distribution of the lanes to multiple end-point devices.

In some examples, a port bifurcation may bifurcate a port with a same and/or different widths to distribute lanes to multiple end-point devices to accommodate for different bandwidths or speeds of the multiple end-point devices. In some examples, in a 1×16 port bifurcation, a port is configured to support a single link with 16 lanes that is coupled to a single end-point device and in a 2×8 port bifurcation, a port is configured to support two links, with each link having 8 lanes. In some examples, a port on chipset 108 may support other port bifurcations such as 8×2, 4×4, etc. In some examples, the ports may support one or more different communication protocols such as peripheral component interconnect (PCI), PCI Express (PCIe), serial at attachment (SATA), gigabyte link (Glink), Ethernet, and/or the like. In some examples, the ports of chipset 108 are configured by BIOS 104. In some examples, ports 116, 118, 120, and 122 of chipset 108 are configured by a chipset configuration descriptor which is built or generated by BIOS 104 at run-time.

Platform connectors 110, 112, and 114 may be platform connectors coupled to different end-point devices such as graphics cards, memories, audio cards, Ethernet cards, flash drives, display ports, and/or the like. to transfer and receive data to and from end-point devices coupled to these platform connectors. In some examples, platform connectors 110, 112, and 114 may have different connector types such as mezzanine slots, backplanes, risers, special connectors (e.g. slimlines), embedded devices, and/or the like. In some examples, platform connectors 110, 112, and 114 may support one or more communication protocols such as PCI, PCIe, SATA, Glink, Ethernet, and/or the like. As further shown in FIG. 1, port 116 is coupled to platform connector 110, port 118 is coupled to platform connector 112, port 120 is coupled to platform connector 114, and port 122 is coupled to processor 102 and memory 106. In some examples, a port may not be coupled to any platform connector. In some examples, only certain lanes of a port may be coupled to a platform connector. In some examples, multiple ports may be grouped to be coupled to one or more platform connectors. In some examples, some or every lane of a port may be split to connect to one or more platform connectors.

As discussed above and further emphasized hereafter, FIG. 1 is merely an example which should not unduly limit the scope of the claims. One of ordinary skill in the art would recognize many variations, alternatives, and modifications. According to some embodiments, computing unit 100 may include any number of chipsets (e.g., chipset 108), where each chipset may include any number of ports with the same and/or different configurations, features, requirements, and/or the like, any number of platform connectors with the same and/or different features, requirements, and/or the like. In some embodiments, the connections between the ports and the platform connectors may be different than as depicted in FIG. 1. In some examples, a port may be coupled to one or more platform connectors. In some examples, a platform connector may be coupled to one or more ports.

FIG. 2 illustrates a simplified chipset description table 200 according to some embodiments. According to some embodiments, chipset description table 200 may include, but is not limited to, fields such as a silicon type 204, an enable status 206, a port ID 208, a port type 210, a global lane offset 212, a device number (Dev. Num.) 214, a function number (Func. Num.) 216, a bifurcation support 218, a hotplug support 220, a power capability 222, and/or the like. In chipset description table 200, each row represents a port of the chip set and each column represents features, requirements, and capabilities of that port.

Chipset description table 200 provides information about capabilities and features of each port of a chipset, such as chipset 108. In some examples, silicon type 204 indicates a vendor of the chipset. In the example of row 1 in FIG. 2, the vendor of the chipset is AMD® as indicated in silicon type 204-1.

In some examples, enable status 206 indicates whether a port on a chipset is enabled. In the example of row 1 in FIG. 2, the port is enabled as indicated by True in enable status 206-1. In the example of row 2 in FIG. 2, the port is disabled as indicated by False in enable status 206-2.

In some examples, port ID 208 indicates a port identifier of the port on a chipset. In the example of row 1 in FIG. 2, the port is identified by PortId_01 as indicated in port ID 208-1. In the example of row 2 in FIG. 2, the port is identified by PortId_02 as indicated in port ID 208-2.

In some examples, port type 210 indicates communication interfaces that the port on a chipset supports such as PCIe, SATA, Glink, and/or the like. In the example of row 1 in FIG. 2, the communication interfaces that are supported are PCIe, SATA, and Glink as indicated in port type 210-1. In the example of row 2 in FIG. 2, the communication interfaces that are supported are PCIe and SATA as indicated in port type 210-2.

In some examples, global lane offset 212 indicates a global lane offset of the port. In the example of row 1 in FIG. 2, the global lane offset of the port is 0 as indicated in global lane offset 212-1. In the example of row 2 in FIG. 2, the global lane offset of the port is 16 as indicated in global lane offset 212-2.

In some examples, Dev. Num. 214 is an end-point device identifier that indicates the end-point device that a port is coupled to. In the example of row 1 in FIG. 2, the end-point device that the port is coupled to is identified by 5 as indicated in Dev. Num. 214-1. In the example of row 2 in FIG. 2, the end-point device that the port is coupled to is identified by 3 as indicated in Dev. Num. 214-2.

In some examples, Func. Num. 216 indicates a function, a program code, and/or an operation that the identified end-point device may access and/or operate. In the example of row 1 in FIG. 2, the function, program code, and/or operation that the identified end-point device may access and/or operate is identified by 1 as indicated in Func. Num. 216-1. In the example of row 2 in FIG. 2, the function, program code, and/or operation that the identified end-point device may access and/or operate is identified by 2 as indicated in Func. Num. 216-2.

In some examples, bifurcation support 218 indicates the types of bifurcations that the port may support. In the example of row 1 in FIG. 2, the port bifurcations that the port may support are 1×16, 2×8, 4×4, and 2×4×8 as indicated in bifurcation support 218-1. In the example of row 2 in FIG. 2, the port bifurcations that the port may support are 1×16 and 2×8 as indicated in bifurcation support 218-2. In the 1×16 port bifurcation, the port may support a single ×16 link that is coupled to a single end-point device, in the 2×4 port bifurcation, the port may support two ×8 links, where each link is coupled to a single end-point device, and in the 2×4×8 port bifurcation, the port may support three links which are a ×2 link, ×4 link, and ×8 link, where each link is coupled to a single end-point device.

In some examples, hotplug support 220, indicates whether the port supports hotplugging (i.e., whether the port detects a new end-point device is coupled to computing unit 100, while computing unit 100 is operating). In the example of row 1 in FIG. 2, the port supports hotplugging as indicated by True in hotplug support 220-1. In the example of row 2 in FIG. 2, the port does not support hotplugging as indicated by False in hotplug support 220-2.

In some examples, power capability 222 indicates a maximum power that a port can support in Watts. In the example of row 1 in FIG. 2, the maximum power of the port is 75 Watts as indicated in power capability 222-1. In the example of row 2 in FIG. 2, the maximum power of the port is 70 Watts as indicated in power capability 222-2.

It is understood that chipset description table 200 contains examples of types of rows/entries that may occur in a chipset description table. It is also understood that fields described in chipset description table 200 may be represented by different labels and/or numerical values. For example, a port type may be represented as port-1 or a numerical value of 1.

In some examples, a chipset description table for an actual chipset may include the same, fewer, and/or more ports/rows and/or columns than are depicted in chipset description table 200. In some examples, others 226 indicates other fields may be included in chipset description table 200.

FIG. 3 illustrates a simplified platform description table 300 according to some embodiments. According to some embodiments, platform description table 300 may include, but is not limited to, fields such as a silicon ID 304, a connector ID 306, a lane offset 308, a lanes field 310, a connector type 314, a chipset port ID 316, a connector hotplug support 318, a connector power capability 320, and/or the like. Platform description table 300 provides information about each platform connector of a computing unit, such as computing unit 100. In some examples, the features, the requirements, the connections, and/or the like of the platform connectors are detected and discovered by CPLD, a BMC, and/or the like at run-time. In some examples, silicon ID 304 indicates a vendor of the platform. In the example of row 1 in FIG. 3, the vendor of the platform is AMD® as indicated in silicon ID 304-1.

In some examples, connector ID 306 indicates an identification of a platform connector. In the example of row 1 in FIG. 3, the platform connector is identified by CON-A as indicated in connector ID 306-1. In the example of row 2 in FIG. 3, the platform connector is identified by CON-B as indicated in connector ID 306-2.

In some examples, lane offset 308 indicates a lane offset from which the platform connector is coupled to a port. In the example of row 1 in FIG. 3, the lane offset from which the connector is coupled to a port is 0 as indicated in lane offset 308-1. In the example of row 2 in FIG. 3, the lane offset from which the connector is coupled to a port is 8 as indicated in lane offset 308-2.

In some examples, lanes field 310 indicates a number of lanes of the platform connector that are coupled to a port. In the example of row 1 in FIG. 3, the number of lanes of the platform connector that are coupled to a port is 16 as indicated in lanes 310-1. In the example of row 2 in FIG. 3, the number of lanes of the platform connector is coupled to a port that are 8 as indicated in lanes 310-2.

In some examples, connector type 314 indicates a type of the platform connector. In the example of row 1 in FIG. 3, the type of the platform connector is Glink as indicated in connector type 314-1. In the example of row 2 in FIG. 3, the type of the platform connector is PCIe as indicated in connector type 314-2.

In some examples, chipset port ID 316 indicates an identification of a port that the platform connector is coupled to. In the example of row 1 in FIG. 3, the port that the platform connector is coupled to is PortId_01 as indicated in chipset port ID 316-1. In the example of row 2 in FIG. 3, the port that the platform connector is coupled to is PortId_03 as indicated in chipset port ID 316-2.

In some examples, connector hotplug support 318 indicates whether the platform connector supports hotplugging. In the example of row 1 in FIG. 3, the platform connector supports hotplugging as indicated in connector hotplug support 318-1. In the example of row 2 in FIG. 3, the platform connector does not support hotplugging as indicated in connector hotplug support 318-2.

In some examples, connector power capability 320 indicates a maximum power that a platform connector can support. In the example of row 1 in FIG. 3, the maximum power of the platform connector is 75 Watts as indicated in connector power 320-1. In the example of row 2 in FIG. 3, the maximum power of the platform connector is 70 Watts as indicated in connector power 320-2.

It is understood that platform description table 300 contain examples of types of rows/entries that may occur in a platform description table. It is also understood that fields described in platform description table 300 may be represented by different labels and/or numerical values. For example, connector ID 306 may be represented as Glink001 or a numerical value of 001. In some examples, a platform description table for an actual platform may include the same, fewer, and/or more platform connectors/rows and/or columns than are depicted in platform description table 300. In some examples, others 322 indicates that other fields may be included in platform description table 300 such as lane reversal, type of a platform connector (e.g., a riser, a mezzanine slot, an embedded connector, and/or the like), and/or the like.

FIG. 4 illustrates a simplified desired interface configuration table 400 according to some embodiments. According to some embodiments, desired interface configuration table 400 may include, but is not limited to, fields such as a port type 410, a lane count 414, a hotplug support 416, a lane offset 418, a lane width 420, and a bayId ID 422.

Desired interface configuration table 400 provides information about desired interface configurations to be implemented on a chipset and a platform, such as chipset 108 and computing unit 100 of FIG. 1. In some embodiments, the desired interface configurations may be used to specify a configuration of the chipset as installed on the platform. In some examples, the choice of how to configure the chipset to support the desired interfaces may depend on the capabilities of the ports of the chipset, the capabilities of the connectors of the platform, and/or the like. In some examples, the desired interface configurations may be determined based on a configuration for an already configured chipset and then used as the basis for determining how to configure a different chipset, a different platform, and/or a different chipset and a different platform.

In some embodiments, when desired interface configuration table corresponds to an already configured chipset, the information in desired interface configuration table 400 is detected and discovered by a CPLD, a BMC, and/or the like. In some examples, the values for each of the fields of desired interface configuration table 400 are detected and discovered by the CPLD, the BMC, and/or the like through pins of chipset 108 that are coupled to I/O pins of the CPLD, the BMC, and/or the like. In some embodiments, fields of desired interface configuration table 400 are detected and discovered at run-time.

In some examples, port type 410 indicates a type of the desired interface. In the example of row 1 in FIG. 4, the port type of the desired interface configuration is Glink as indicated in 410-1.

In some examples, lane count 414 indicates a number of lanes for the desired interface. In the example of row 1 in FIG. 4, the number of lanes for the desired interface is 16 as indicated in lane count 414-1. In the example of row 2 in FIG. 4, the number of lanes on the desired interface is 4 as indicated in lane count 414-2.

In some examples, hotplug support 416 indicates whether the desired interface should support hotplugging. In the example of row 1 in FIG. 4, the desired interface should support hotplugging as indicated by 1 in 416-1. In the example of row 2 in FIG. 4, the desired interface should support hotplugging as indicated by 1 in 416-2.

In some examples, lane offset 418 indicates a desired offset of lanes on a platform connector for the desired interface. In the example of row 1 in FIG. 4, the desired offset of lanes on the platform connector is 0 as indicated in 418-1. In the example of row 2 in FIG. 4, the desired offset of lanes on the platform connector is 0 as indicated in 418-2.

In some examples, lane width 420 indicates a desired lane width of the desired interface. In the example of row 1 in FIG. 4, the desired lane width is 16 as indicated in 420-1. In the example of row 2 in FIG. 4, the desired lane width is 16 as indicated in 420-2.

In some examples, bayld ID 422 indicates a desired drive bay identification of a platform connector for the desired interface. In the example of row 1 in FIG. 4, the desired drive bay identification of the platform connector is 00 as indicated in 422-1. In the example of row 2 in FIG. 4, the desired drive bay identification of the platform connector is 01 as indicated in 422-2.

In some examples, one or more fields in desired interface configuration table 400 may be used to indicate a desired grouping of the desired interface configurations such as a drive bay identification (bayld ID 422), an index (not shown), a connector identifier (not shown), a connector type (not shown), and/or the like.

It is understood that desired interface configuration table 400 contains examples of types of rows/entries that may occur in a desired interface configuration table. It is also understood that fields described in desired interface configuration table 400 may be represented by different labels and/or numerical values. For example, port type 410-1 may be represented as Glink-ID1 or a numerical value of 01. In some examples, a desired interface configuration table may include fewer or more desired interface configurations/rows and/or columns than are depicted in desired interface configuration table 400. In some examples, others 424 indicates that other fields may be included in desired interface configuration table 400 such as lane reversal, and/or the like.

FIG. 5 illustrates an example of desired interface configurations versus the platform connector and port combinations table 500 according to some embodiments. According to some embodiments, each row in table 500 represents whether both of a platform connector (e.g., a platform connector from a platform description table, such as platform description table 300 in FIG. 3) and a port on the chipset (e.g., a port from a chipset description table, such as chipset description table) that the platform connector is coupled to support each of the features and requirements of a desired interface configuration. In table 500, the platform connectors and ports combinations are represented in columns. For example, PortId_01/CON-A indicates that PortId_01 is coupled to CON-A. In table 500, the desired interface configurations are repressed in rows. For example, Glink 502-1 represents a desired interface configuration with a type of Glink. Use of FIG. 5 is described in more detail with respect to FIG. 7.

It is understood that desired interface configurations versus platform connector and port combinations table 500 contain examples of desired types of rows/entries that may occur in a desired interface configurations versus platform connector and port combinations table. It is also understood that fields described in desired interface configurations versus platform connector and port combinations table 500 may be represented by different labels and/or numerical values. For example, a cell represented as True may be represented as Yes or a numerical value of 1. In some examples, a desired interface configurations versus platform connector and port combinations table for an actual chipset and/or a platform may include the same, fewer, and/or more desired interface configuration rows and/or columns than are depicted in desired interface configurations versus platform connector and port combinations table 500.

FIG. 6 illustrates a simplified chipset configuration descriptor 600 according to some embodiments. According to some embodiments, chipset configuration descriptor 600 may include different sections for different sockets of the chipset. In some examples, chipset configuration descriptor 600 may be generated based on information in a chipset description table (e.g., chipset description table 200), a platform description table (e.g., platform description table 300), and/or a desired interface configuration table (e.g., desired interface configuration table 400)

In some embodiments, chipset configuration descriptor 600 may include a header section 602a and a port details section 602b.

In some examples, header section 602a may include, but is not limited to, fields such as a socket ID 604, a table size 606, a table signature 608, and/or the like. In some examples, some or all of header section 602a may be generated after port details section 602b is generated. In some examples, some or all of header section 602a may be updated after each port is added to port details section 602b. In some examples, socket ID 604 is a socket/silicon identifier and indicates a vendor of chipset 108. In some examples, table size 606 indicates a number of bytes of chipset configuration descriptor 600. In some examples, table signature 608 provides a check value for validating chipset configuration descriptor 600. In some examples, table signature 608 may be generated by one or more methods, such as a cyclic redundancy check (CRC), a checksum, and/or the like. In some examples, socket ID 604 may indicate the vendor of the chipset for which the chipset configuration descriptor 600 was generated. In some examples, the values for socket ID 604 may be similar to silicon type 204 in chipset description table 200 in FIG. 2 and/or silicon ID 304 in platform description table 300 in FIG. 3. In the example of row 1 in the header section 602a of the chipset configuration descriptor 600 in FIG. 6, the vendor of the chipset is AMD® as indicated in socket ID field 604-1, the table size of chipset configuration descriptor 600 is 26436 bytes as indicated in table size field 606-1, and the table signature of chipset configuration descriptor 600 is 926040356 as indicated in table signature field 608-1.

It is understood that header section 602a contains examples of types of rows/entries that may occur in a chipset configuration descriptor. It is also understood that fields described in header section 602a may be represented by different labels and/or numerical values. For example, socket ID 604 may be represented as a numerical value of 1. In some examples, a header section may include the same, fewer, and/or more rows and/or columns than are depicted in header section 602a.

In some examples, port details section 602b may include, but is not limited to, fields such as a port number 610, a port type 612, a hotplug support 614, a start lane 616, an end lane 618, an enable status 620, a device number (Dev. Num.) 622, a function number (Func. Num.) 624 fields, and/or the like.

In some examples, each row/entry in port details section 602b corresponds to each a row/entry in a desired interface configuration table, such as desired interface configuration table 400 from FIG. 4. In some examples, a row in port details section 602b may be assigned to a port on chipset 108 represented by port number 610. In the example of row 1 in port details section 602b in FIG. 6, a port with a port number of PortId_01, as indicated in 610-1, corresponds to row 1 in FIG. 4. In the example of rows 2 to 5 of port details section 602b in FIG. 6, the rows are identified by port number PortId_04a-d 610-2 to 610-5, corresponding to rows 2 to 5 in FIG. 4.

In some examples, port type 612 indicates a type of a port. In the example of row 1 in port details section 602b in FIG. 6, the type of the port is Glink as indicated in port type 612. In the example of row 2 in port details section 602b in FIG. 6, the type of the port is PCIe as indicated in port type 612.

In some examples, hotplug support 614 indicates whether a port supports hotplugging. In the example of row 1 in port details section 602b in FIG. 6, the port supports hotplugging as indicated by 1 in hotplug support 614-1. In the example of row 2 in port details section 602b in FIG. 6, the port also supports hotplugging as indicated by 1 in hotplug support 614-2.

In some examples, start lane 616 indicates a start lane of a port. In the example of row 1 in port details section 602b in FIG. 6, the port starts from lane 0 as indicated in start lane 616-1. In the example of row 2 in port details section 602b in FIG. 6, the port starts from lane 0 as indicated in start lane 616-1.

In some examples, end lane 618 indicates an end lane of a port. In the example of row 1 in port details section 602b in FIG. 6, the last lane of the port is lane 15 as indicated in end lane 618-1. In the example of row 2 in port details section 602b in FIG. 6, the last lane of the port is lane 3 as indicated in end lane 618-2.

In some examples, enable status 620 indicates whether a port is enabled. In the example of row 1 in port details section 602b in FIG. 6, the port is enabled as indicated by True in 620-1. In the example of row 2 in port details section 602b in FIG. 6, the port is also enabled as indicated by 1 in 620-1.

In some examples, Dev. Num. 622 is an end-point device identifier that indicates the end-point device that a port is coupled to. In the example of row 1 in port details section 602b in FIG. 6, the end-point device that the port is coupled to is identified by 5 as indicated in Dev. Num. 622-1. In the example of row 2 in port details section 602b in FIG. 6, the end-point device that the port is coupled to is identified by 3 as indicated in Dev. Num. 622-2.

In some examples, Func. Num. 624 indicates a function, a program code, and/or an operation that the identified end-point device may access and/or operate. In the example of row 1 in port details section 602b in FIG. 6, the function, program code, and/or operation that the identified end-point device may access and/or operate is identified by 1 as indicated in Func. Num. 624-1. In the example of row 2 in port details section 602b in FIG. 6, the function, program code, and/or operation that the identified end-point device may access and/or operate is identified by 2 as indicated in Func. Num. 624-2.

It is understood that port details section 602b contains examples of types of rows/entries a port details section. It is also understood that fields described in port details section 602b may be represented by different labels and/or numerical values. For example, port type 612 may be represented as port-01, as a numerical value of 01, and/or the like. In some examples, a port details section may include the same, fewer, and/or more ports/rows and/or columns as indicated by others field 626 than are depicted in port details section 602b.

In some examples, a static chipset table discussed above cannot be used to configure the ports on the chipset as the port and/or platform configurations may be different for different combinations of chipsets and platforms. In some examples, a static chipset table may not be usable with different platforms. As such, a method for generating a dynamic chipset configuration descriptor to configure the ports of the chipset based on the actual chipset and platform to be configured. In some examples, ports on a chipset may be coupled to different platform connectors on different platforms. In some examples, ports and platform connectors may support different features and requirements such as port types, bifurcations, number of lanes, power requirements, hotplug requirements, and/or the like. Therefore, there may be many platform connector and port combination assignment possibilities or candidates to choose therefrom to assign each of the desired interface configurations to a platform connector and port combination that are able to support the desired interface configuration. As such, an algorithm may be applied to choose a best fit or candidate for assigning the desired interface configurations and use it to build a dynamic chipset configuration descriptor for different combinations of chipsets and platforms.

Figure 7:
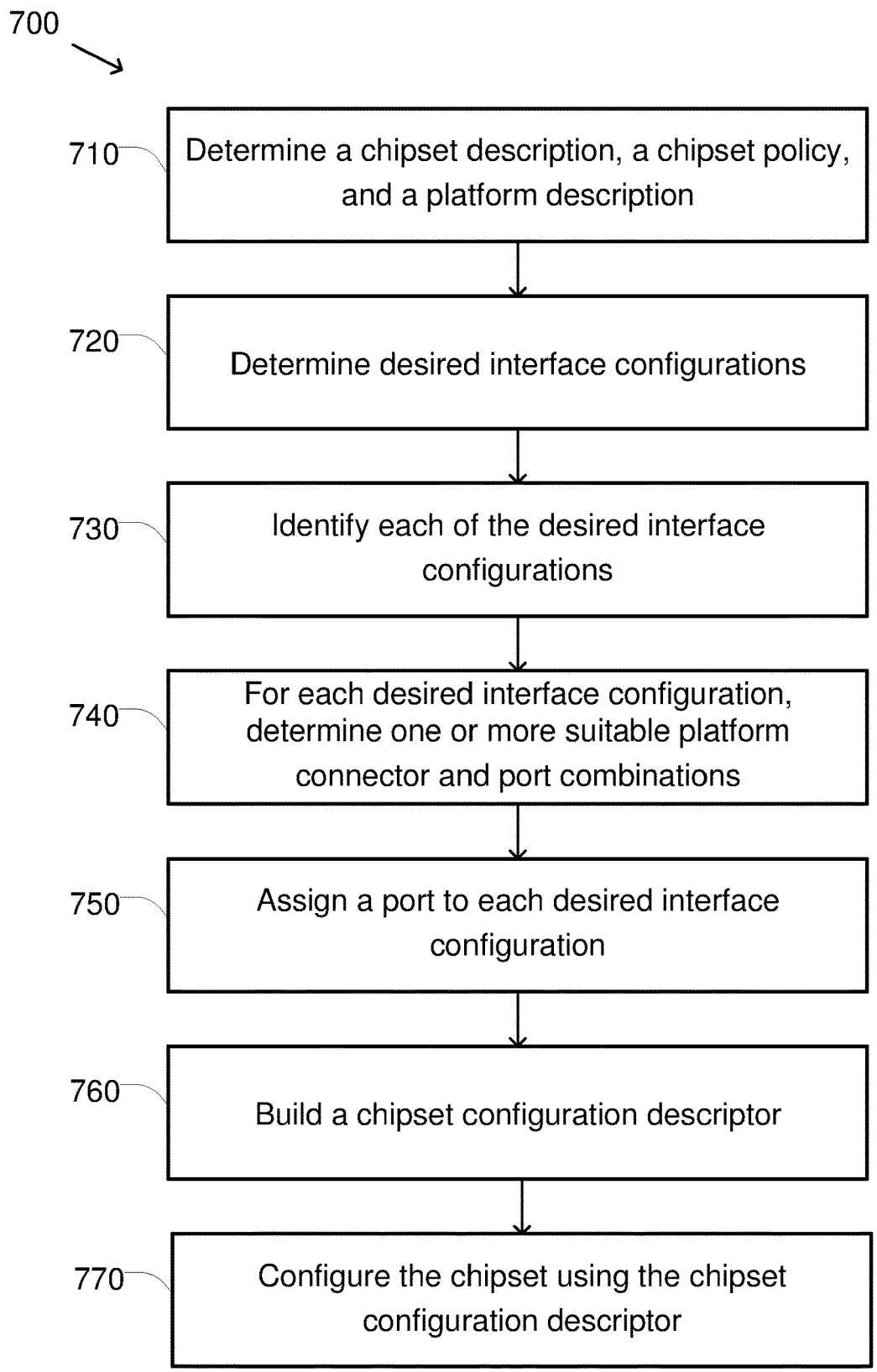
FIG. 7 illustrates a simplified block diagram of a method of generating a chipset configuration descriptor, according to some embodiments.

FIG. 7 is a simplified block diagram of a method 700 of building a chipset configuration descriptor, according to some embodiments. According to some embodiments, the chipset configuration descriptor may be used to dynamically initialize a chipset at. One or more of the processes 710-770 of method 700 may be implemented, at least in part, in the form of executable code stored on non-transient, tangible, machine-readable media that when run by one or more processors (e.g., the processor 102 in computing unit 100) may cause the one or more processors to perform one or more of the processes 710-770. In some embodiments, method 700 may be performed to build or generate a chipset configuration descriptor (e.g., the chipset configuration descriptor 600) to configure the ports on a chipset based on a desired interface configuration table (e.g., the desired interface configuration table 400) and as supported by the port features in a chipset configuration table (e.g., the chipset description table 200) and as supported by the connector features in a platform configuration table (e.g., the platform description table 300).

Method 700 may be performed by one or more applications, such as BIOS 104 in processor 102, to configure, update, and validate a configuration descriptor of a chipset at run-time. In some embodiments, a different chipset configuration descriptor is generated for different chipsets, different platforms, and/or the like. In some examples, a different chipset configuration descriptor is generated when the chipset is replaced with a different chipset in a platform. In some embodiments, a different chipset configuration descriptor is generated when the chipset and/or the platform is changed and/or updated. In some embodiments, a different chipset configuration descriptor is generated to change and/or update the port configuration of the chipset without having to update the firmware (i.e., BIOS 104). According to some embodiments, the order of processes 820 and 830 may be revered. Several aspects of method 700 are described via reference to the non-limiting examples of tables and policies in FIGS. 2-6 and it is understood that method 700 is applicable to different tables and policies than those described in FIGS. 2-6.

At a process 710, a chipset description, a chipset policy, and a platform description are determined. In some examples, the chipset description and the platform description may be represented in different formats such as tables and/or the like. In some examples, the chipset description may include information consistent with the entries in chipset description table 200 and the platform description table may be consistent with platform description table 300. According to some embodiments, the chipset description table, the chipset policy, and the platform description table are received by BIOS 104 of FIG. 1. In some examples, the chipset description table, the chipset policy, and the platform description table are stored in a memory such as memory 106, accessible by BIOS 104. In some examples, BIOS 104 may determine the chipset description table, the platform description table, and the chipset policy during a boot operation.

At a process 720, desired interface configurations are determined. In some examples, the desired interface configurations may be represented in different formats such as tables and/or the like. In some examples, the desired interface configuration table may include information consistent with the entries in desired interface configuration table 400. According to some embodiments, the desired interface configuration table is received by BIOS 104 of FIG. 1. In some examples, BIOS 104 may detect chipset 108 and receive the desired interface configuration table during a boot operation. In some examples, BIOS 104 may receive the desired interface configuration table from a BMC, a CPLD, and/or the like that can detect the desired interface configurations. In some examples, a CPLD may detect and discover the ports and ports configuration of chipset 108 through pins of chipset 108 coupled to I/O pins of the CPLD.

At a process 730, each of the desired interface configurations is identified. In some examples, the desired interface configurations are identified and analyzed. In some examples, the desired interface configurations are identified by methods such as parsing, decoding, etc. In some examples, each desired interface configuration may have a specific configuration such as port type, a number of lanes, a hotplugging requirement, and/or the like. Examples of desired interface configurations are shown in FIG. 4. In the example of row 1 in FIG. 4, a port with a port type of Glink 410-1 has 16 lanes and requires hotplugging. In the example of row 2 in FIG. 4, a port with a port type of PCIe 410-2 has 4 lanes and requires hotplugging.

At a process 740, one or more suitable platform connector and port combinations for each desired interface configuration are determined. In some embodiments, a platform connector and a port form a combination when they are coupled. In some embodiments, a platform connector and port combination is considered suitable for a desired interface configuration when it is determined that they support the configuration, features, and requirements specified in the desired interface configuration. In some examples, a platform connector and port combination supports a desired interface configuration when both of the port and its platform connector supports each of the configuration, the features, and the requirements of the desired interface configuration such as a port type, a lane requirement, a hotplug requirement, a power requirement, a bifurcation requirement, and/or the like. In some examples, a platform connector and port combination for a desired interface configuration may be determined by performing methods 800 and 900 for that desired interface configuration.

Figure 8:
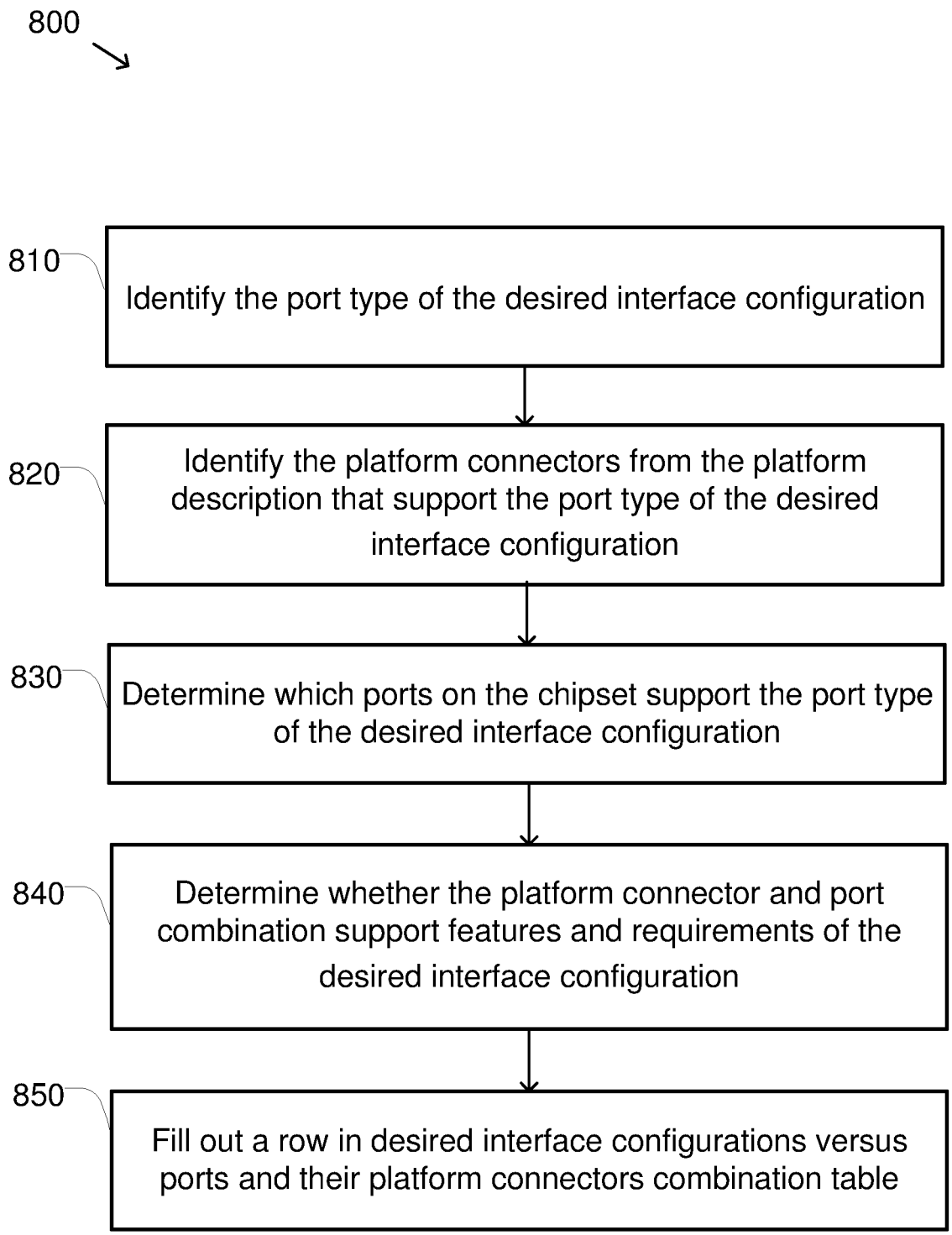
FIG. 8 illustrates a simplified block diagram of a method of determining whether a platform connector and port combination supports a desired interface configuration, according to some embodiments.

FIG. 8 is a simplified block diagram of method 800 of determining whether a platform connector and port combination to support a desired interface configuration according to some embodiments. According to some embodiments, method 800 determines whether a platform connector and port combination may be assigned to a desired interface configuration (i.e., the platform connector and port combination supports the configuration, the features, and the requirements of the desired interface configuration). One or more of the processes 810-850 of method 800 may be implemented, at least in part, in the form of executable code stored on non-transient, tangible, machine-readable media that when run by one or more processors (e.g., the processor 102 in computing unit 100) may cause the one or more processors to perform one or more of the processes 810-850.

At a process 810, a port type of a desired interface configuration is identified. In some examples, the port type of the desired interface configuration is identified by a port type field in the desired interface configuration table. In the example of row 1 in FIG. 4, the port type is identified by the port type of Glink 410-1. In the example of row 2 in FIG. 4, the port type is identified by the port type of PCIe 410-2.

At a process 820, platform connectors that support the port type in the desired interface configuration are identified or found in the platform description table. In some examples, the platform connectors are identified by a corresponding connector type as indicated in a connector type field in the platform description table. In the example of row 1 in FIG. 4, the platform connector with the corresponding port type of Glink 410-1 is identified or found in row 1 from connector type Glink 314-1 in platform description table 300 in FIG. 3. In the example of row 2 in FIG. 4, the platform connector with the corresponding port type of PCIe 410-2 are respectively identified or found in row 2 (i.e., connector type 314-2) and row 4 (i.e., connector type 314-4) in platform description table 300 in FIG. 3.

At a process 830, it is determined which ports on the chipset support the port type of the desired interface configuration. Each of the ports on the chipset that are coupled to a platform connector that supports the port type of the desired interface configuration are evaluated to determine whether they also support the port type of the desired interface configuration.

In some embodiments, it is determined that the identified port on the chipset supports the port type of the desired interface configuration when the identified port supports the communication interface of the desired interface configuration. In some examples, the port of the identified platform connectors that support the port type of the desired interface configuration are identified or found by a chipset port identifier in the platform description table. In some examples, the port of each identified platform connector may correspond to a port in the chipset description table by a port identifier based on the chipset port identifier in the platform description table. In some examples, the port types supported by each identified port are identified in a port type field in the chipset description table. In some examples, each identified port may support one or more port types. In some examples, one or more identified port may support the port type of the desired interface configuration.

In the example of row 1 in FIG. 4, as shown in row 1 in FIG. 3, the identified platform connector CON-A that supports the desired interface configuration of Glink 410-1 is coupled to PortId_01 as indicated by chipset connector port ID 316-1 which corresponds to Port ID PortId_01 208-1 in chipset description table 200 in FIG. 2 and PortId_01 supports PCIe, SATA, and Glink port types as indicated in port type 210-1. Therefore, it is determined that PortId_01 supports the port type of desired interface configuration of row 1 in FIG. 4.

In the example of row 2 in FIG. 4, as shown in rows 2 and 4 in FIG. 3, the identified platform connectors CON-B and CON-D that support the desired interface configuration of PCIe 410-2 are respectively coupled to PortId_03 as indicated by chipset port ID 316-2 and PortId_02 as indicated by chipset port ID 316-5. Chipset port ID PortId_03 316-2 corresponds to port ID PortId_03 208-3 in chipset description table 200 in FIG. 2 and PortId_03 supports PCIe, SATA, and Glink port types as indicated in port type 210-3. Therefore, it is determined that PortId_03 supports the port type of desired interface configuration of row 2 in FIG. 4. Chipset port ID PortId_02 316-4 corresponds to port ID PortId_02 208-2 in chipset description table 200 in FIG. 2 and PortId_02 supports PCIe and SATA port types as indicated in port type 210-2. Therefore, it is determined that PortId_02 supports the port type of desired interface configuration of row 2 in FIG. 4.

Thus, in the example of row 1 in FIG. 4, the desired interface configuration of Glink 410-1 is supportable by PortId_01 on the chipset and its corresponding platform connector CON-A. In the example of row 2 in FIG. 4, the desired interface configuration of PCIe 410-2 is supportable be either PortId_02 and its corresponding platform connector CON-D or PortId_03 on the chipset and its corresponding platform connector CON-B.

At a process 840, it is determined whether the platform connector and the port combination support features and requirements of the desired interface configuration. In some examples, one or both of the platform connector and the port combination may not support each of the features and requirements of the desired interface configuration. In some examples, the features and requirements of the desired interface configuration may include a hotplug requirement, a power requirement, an enable status, a number of lanes requirement, and/or the like. In some examples, if the identified platform connector does not support the lanes requirement of the desired interface configuration, multiple platform connectors may be used to support the lanes requirement of the configuration. In some examples, multiple combinations of platform connectors and the ports may support the features and requirements of the desired interface configuration. In some examples, whether each of the combinations of platform connectors and the ports supports the features and requirements of the desired interface configuration may be determined by performing a method 900 for that desired interface configuration against each of the ports identified in process 830.

Figure 9:
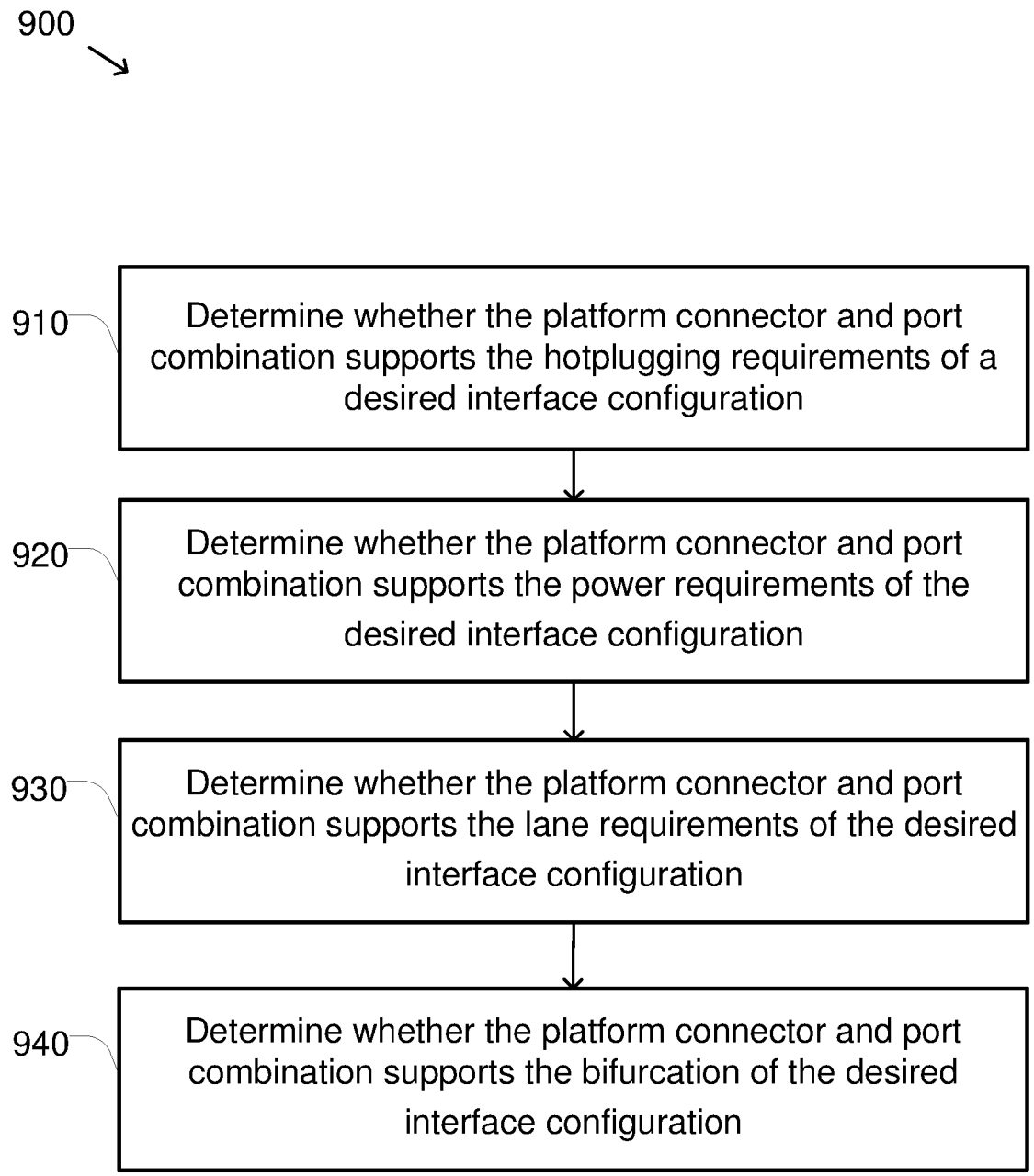
FIG. 9 illustrates a simplified block diagram of a method of determining whether a platform connector and port combination on a chipset support desired interface configurations features, according to some embodiments.

FIG. 9 is a simplified block diagram of method 900 of determining whether a platform connector and port combination support features of a desired interface configuration, according to some embodiments. In some embodiments, one or more of determining and/or validating tests are performed to determine whether the platform connector and port combination support features of a desired interface configuration. In some examples, these tests may include, but are not limited to, determining whether the platform connector and port combination support hotplug features, power capabilities, port bifurcations, lane reversal requirements, enable requirements, lanes status requirements, platform connector types, platform connector descriptions, and/or the like. Method 900 includes examples of these tests. One or more of the processes 910-940 of method 900 may be implemented, at least in part, in the form of executable code stored on non-transient, tangible, machine-readable media that when run by one or more processors (e.g., the processor 102 in computing unit 100) may cause the one or more processors to perform one or more of the processes 910-940.

At a process 910, it is determined whether the platform connector and port combination support the hotplugging requirements of the desired interface configuration. In some examples, one or both of the platform connector and its corresponding port may not support the hotplugging requirement of the desired interface configuration. In some examples, the hotplug support of the identified platform connector may be indicated in a connector hotplug support field in the platform description table. In some examples, the hotplug support of the port on the chipset may be indicated in hotplug support field in the chipset description table. When the desired interface configuration does not require hotplugging, the hotplugging support by a platform connector and a port may be ignored because a platform connector and/or a port that supports hotplugging also supports a desired interface configuration that does not require hotplugging. When the desired interface requires hotplugging support, both of the platform connector and the port have to support hotplugging, Thus, when the desired interface configuration requires hotplugging support and either of the platform connector and its corresponding port does not support hotplugging, it is determined that the platform connector and port combination do not support a desired interface configuration that requires hotplugging.

In the example of row 1 in the desired interface configuration table 400 requires hotplugging as indicated by 1 in hotplug support 416-1. In the example of the PortId_01/CON-A combination in row 1 in FIG. 3, the platform connector CON-A 306-1 that is coupled to PortId_01 316-1, supports hotplugging as indicated by True in connector hotplug support field 318-1 in platform description table 300, and PortId_01 316-1 also supports hotplugging as indicated by True in hotplug support field 220-1 in chipset description table 200. Therefore, the combination of PortId_01/CON-A supports the hotplug requirement of row 1 of the desired interface configuration table 400.

In the example of the PortId_03/CON-B combination in row 2 in FIG. 3, the platform connector CON-B 306-2 that is coupled to PortId_03 316-2, does not support hotplugging as indicated by False in connector hotplug support field 318-2 in platform description table 300 but PortId_03 316-2 supports hotplugging as indicated by True in hotplug support field 220-3 in chipset description table 200. Therefore, the combination of PortId_03/CON-B does not support the hotplug requirement of a desired interface configuration that requires hotplugging.

In the example of the PortId_03/CON-B combination in row 4 in FIG. 3, the platform connector CON-D 306-4 that is coupled to PortId_02 316-2, supports hotplugging as indicated by True in connector hotplug support field 318-4 in platform description table 300 but PortId_02 316-2 does not support hotplugging as indicated by False in hotplug support field 220-2 in chipset description table 200. Therefore, the combination of PortId_03/CON-B does not support the hotplugging requirement of a desired interface configuration that requires hotplugging.

At a process 920, it is determined whether the platform connector and port combination support the power requirements of the desired interface configuration. In some examples, one or both of the platform connector and its corresponding port may not support the power requirements of the desired interface configuration. In some examples, the power capability of the port on the chipset may be indicated in a power capability field in the chipset description table. In some examples, the power capability of the platform connector may be indicated in a connector power capability field in the platform description. In some embodiments, when each of the power of the platform connector and port is more than or equal to the power requirement of a desired interface configuration, it is determined that the platform connector and port support the power requirements of the desired interface configuration.

In the example of the PortId_01/CON-A combination in row 1 in FIG. 3, the power capability of the platform connector CON-A 306-1 is 75 Watts as indicated in connector power field 320-1 in platform description table 300 and the power of PortId_01 316-1 is also 75 Watts as indicated in a power capability field 222-1 in chipset description table 200. Therefore, the combination of PortId_01/CON-A supports a desired interface configuration that has a power requirement of up to 75 Watts.

In the example of the PortId_03/CON-B combination in row 2 in FIG. 3, the power capability of the platform connector CON-B 306-2 is 70 Watts as indicated in connector power field 320-2 in platform description table 300 and the power of PortId_03 316-3 is 75 Watts as indicated in a power capability field 222-3 in chipset description table 200. Therefore, the combination of PortId_03/CON-B supports a desired interface configuration that has a power requirement of up to 70 Watts.

At a process 930, it is determined whether the platform connector and port combination support the lane requirements of the desired interface configuration. In some examples, one or both of the platform connector and its corresponding port may not support the lane requirements of the desired interface configuration. In some examples, the number of lanes that the port on the chipset supports may be indicated by the difference between global lane offset fields of the port and the subsequent port in the chipset description. In some examples, the offset and number of the lanes of the platform connector that are coupled to the port may be indicated in a lane offset and lanes field in the platform description. In some embodiments, when the number of lanes available in each of the platform connector and port are more than or equal to the number of lane requirements of the desired interface configuration, it is determined that the platform connector and port combination supports the lane requirements of the desired interface configuration. In some examples, if the platform connector does not have enough lanes to support the lanes requirement of the desired interface configuration and/or if the port does not have enough lanes to support the lanes requirement of the desired interface configuration, the desired interface configuration may be split between multiple platform connectors and/or ports which is discussed in detail further below.

In the example of PortId_01/CON-A combination in row 1 in FIG. 3, the number of lanes of the identified platform connector CON-A 306-1 is 16 lanes with lane offset of 0 as indicated by respectively lane offset 308-1 and lanes 310-1 fields, and the number of lanes of its corresponding port PortId_01 316-1 is 16 as indicated by the difference between global lane offset of PortId_01 which is 0 212-1 and the global lane offset of the subsequent port identified by PortId_02 208-2 which is 16 212-2 in chipset description table 200. Therefore, the combination of PortId_01/CON-A supports a desired interface configuration that has up to 16 lanes.

In the example of PortId_03/CON-B combination in row 2 in FIG. 3, the number of lanes of the platform connector CON-B 306-2 is 8 lanes with lane offset of 8 as indicated respectively by lane offset 308-2 and lanes 310-2 fields, and the number of lanes of its corresponding port PortId_03 316-2 is 16 as indicated by the difference between global lane offset of PortId_03 which is 32 212-3 and the global lane offset of the subsequent port by PortId_04 208-4 which is 48 212-4 in chipset description table 200. Therefore, the combination of PortId_03/CON-B does not support a desired interface configuration that requires more than 8 lanes.

At a process 940, it is determined whether the platform connector and port combination supports the bifurcation of the desired interface configuration. In some embodiments, it is determined that the platform connector and port combination supports the bifurcation of the desired interface configuration when both the platform connector and port have enough lanes and the port is able to support the bifurcation of the desired interface configuration.

In the example of the PortId_01/CON-A combination in row 1 of FIG. 3, platform connector CON-A has 16 lanes and PortId_01 supports 1×16, 2×8, 4×4, and 2×4×8 bifurcations as indicated in bifurcation support field 218-1 in chipset description table 200. Therefore, the PortId_01/CON-A combination supports one or more desired interface configurations that are bifurcated by any of the 1×16, 2×8, 4×4, and 2×4×8.

In the example of PortId_03/CON-B combination in row 2 in FIG. 3, platform connector CON-B has 8 lanes and PortId_03 supports 4×4 and 2×4×8 bifurcations as indicated in bifurcation support field 218-3 in chipset description table 200. Therefore, the PortId_03/CON-B combination supports one or more desired interface configurations that are bifurcated by any of the 4×4 and 2×4×8.

Referring back to FIG. 8, at a process 850, a row in a desired interface configurations versus platform connector and port combinations table is filled out. In some examples, the desired interface configurations versus platform connector and port combinations table may include information consistent with the entries in desired interface configurations versus platform connector and port combinations table 500 in FIG. 5.

In some examples, if both of the platform connector and the port of a combination support each of the features and requirements of a desired interface configuration such as a port type, a hotplug requirement, a power requirement, a lane requirement, a bifurcation requirement and/or the like of a desired interface configuration (e.g., when the platform connector and the port pass each of the tests in process 860 and method 900), the corresponding cell in table 500 is filled out by a True notation. In some examples, if one or both of the platform connector and the port do not support the each of the features and requirements of the desired interface configuration (e.g., when even one of the platform connector and the port does not pass each of the tests in process 860 and method 900), the corresponding cell in table 500 is filled out by a False notation.

In the example of row 1 in FIG. 5, the combination of PortId_01/CON-A supports each of the features and/or requirements of the desired interface configuration with the type of Glink 502-1, therefore the corresponding cell is filled out by True as indicated in 504-1.

Again, in the example of row 1 in FIG. 5, the combination of PortId_03/CON-B does not support each of the features and requirements of the desired interface configuration with the type of Glink 502-1, therefore the corresponding cell is filled out by False as indicated in 506-1. In this example, with reference to FIG. 3, the connector type of platform connector CON-B 306-2 is PCIe 314-1, therefore it does not support the Glink 502-1 port type of the desired interface configuration in row 1 of FIG. 5.

In the example of row 3 in FIG. 5, the combination of PortId_01/CON-A supports each of the features and requirements of the desired interface configuration with the type of PCIe 502-3, therefore their corresponding cell is filled out by True as indicated in 504-3.

Referring back to FIG. 7, at a process 750, a port is assigned to each of the desired interface configurations. In some embodiments, a greedy algorithm may be used to assign ports to the desired interface configurations. In some examples, the greedy algorithm parses the desired interface configurations versus platform connector and port combinations table from top to bottom and assigns ports to the desired interface configurations in order of the rows.

In the example of row 1 in FIG. 5, a desired interface configuration with a type of Glink 502-1 has two options of being assigned to PortId_01 that is coupled to CON-A, as indicated by True in 504-1 and PortId_04 that is coupled to CON-D as indicated by True in 510-1. In the example of row 3 in FIG. 5, a desired interface configuration with a type of PCIe 502-3 may only be assigned to PortId_01 that is coupled to CON-A as indicated by True respectively in 504-3.

In this example, the greedy algorithm first assigns the desired interface configuration in row 1 to PortId_01 that is coupled to platform connector CON-A 504-1 because there is a True in 504-1, the greedy algorithm then assigns the desired interface configuration in row 2 to PortId_03 that is coupled to platform connector CON-B 506-1 because there is a True in 506-2, and then the greedy algorithm tries to assign the desired interface configuration in row 3, but the only True in that row is already assigned to the desired interface configuration in row 1. Thus, the greedy algorithm is not able to successfully assign all the desired interface configurations in FIG. 5. In some examples, the greedy algorithm would flag this as an error.

In some embodiments, a brute force algorithm may be used to assign a platform connector and port combination to the desired interface configurations. In some examples, the brute force algorithm may be such that every candidate, combination, or possibility of assigning a platform connector and port combination to each desired interface configuration is tested and among which, a candidate is chosen from among the True entries. In other words, the brute force algorithm systematically tries every candidate, combination, or possibility of assigning valid ports to each desired interface configuration until every desired interface configuration can be assigned to a supporting platform connector and port combination. Thus, unlike the greedy algorithm, when the brute force algorithm finds a desired interface configuration that it is not able to assign to a platform connector and port combination, it backtracks to see if one of the previously assigned desired interface configurations may be assigned to a different platform connector and port combination.

In some embodiments, one or more heuristic rules may be used to help more efficiently assign one or more platform connector and port combination to one or more desired interface configurations. In some examples, one or more heuristic rules may be applied to assign a more constrained desired interface configuration first. In some examples, a desired interface configuration may be more constrained because it has fewer options of platform connector and port combination to which it can be assigned (e.g., has fewer True entries). In FIG. 5, row 3 is more constrained than row 1 because row 3 may only be assigned to PortId-01/CON-A combination 504-3, but row 1 has two options of being assigned to PortId-01/CON-A combination 504-1 and PortId-04/CON-D combination 510-1. Thus, when the one or more heuristic rules are applied, the desired interface configuration of row 3 is assigned before the desired interface configuration of row 1.

In some examples, an algorithm is applied to choose a candidate from all the possibilities of desired interface configurations assignments and configurations that is closest or most similar to the currently implemented port assignments and configurations on chipset 108 (i.e., best-known port configurations of the ports of chipset 108).

Similarly, the algorithm may associate each of the determining tests of whether platform connector and port combination satisfy the features, requirements and/or the like of a desired interface configurations with the same numerical values as each of the features, the requirements and/or the like of the desired interface configurations.

Therefore, each of the corresponding cells for the platform connector and port combination and the desired interface configurations in a desired interface configuration versus platform connector and port combinations table (e.g., table 500 in FIG. 5) are filled out with the weighted sum of numerical values of the determining tests instead of True and False notations.

At a process 760, a chipset configuration descriptor is built or generated, according to some embodiments. According to some embodiments, the chipset configuration descriptor includes a header section and a port details section that provides information about the updated and/or changed port configurations of the chipset for a particular platform. According to some embodiments, the chipset configuration descriptor is built or generated based on the platform connector and port combinations assignments from the desired interface configurations versus ports and platform connectors table (e.g., desired interface configurations versus platform connector and port combinations table 500 in FIG. 5), validated by the chipset description (e.g., chipset description table 200 in FIG. 2), the chipset policy, and the platform description (e.g., platform description table 300 in FIG. 3). In some examples, the chipset configuration descriptor may include information consistent with the entries in chipset configuration descriptor 600 in FIG. 6. According to some embodiments, the chipset configuration descriptor is built at during a boot operation.

In the example of row 1 in port details section 602b in FIG. 6, row 1 represents a port that corresponds to the desired interface configuration in row 1 of FIG. 4 in which, the desired interface configuration with a port type Glink 410-1 is assigned to PortId_01 according to process 750 with reference to FIGS. 5 and 7.

In this example, the port type of row 1 in port details section 602b of FIG. 6 is Glink as indicated in 602-1 is generated based on the port type Glink 410-1 of the desired interface configuration in row 1 of FIG. 4. The port of row 1 has 16 lanes as indicated in start lane 610-1 with a value of 0 and end lane 618-1 with a value of 15, which indicates that the port of row 1 is bifurcated to a 1×16 link. In this example, the 16 lanes of the port is based on lane count 16 414-1, lane offset 0 418-1, and lane width 420-1 in row 1 of FIG. 4. The port of row 1 also support hotplugging as indicated in hotplug support 614-1, based on hotplug support 1 416-1 in row 1 of FIG. 4. The port of row 1 is also enabled as indicated in 620-1, based on enable status 206 True 206-1 in row 1 of FIG. 2. Additionally, the device number of the port of row 1 is 5 as indicated in Dev. Num. 5 622-1, based on the device number of PortId_01 Dev. Num. 5 214-1 in row 1 of FIG. 2. Additionally, the function number of the port of row 1 is 1 as indicated in Func. Num. 1 624-1, is based on the function number of PortId_01 Func. Num. 1 216-1 in row 1 of FIG. 2.

In some examples, process 760 further includes generating a header section (e.g., header section 602a in FIG. 6) for the chipset configuration descriptor that provides information about a vender of the chipset, a size of the chipset configuration descriptor, and an identification of the chipset configuration descriptor. In some examples, the header section of the chipset configuration descriptor is generated after the port details section (e.g., port detail section 602b in FIG. 6) of the chipset configuration descriptor is prepared.

In the example of the header section 602a in FIG. 6, socket identifier of the chipset configuration descriptor 600 is socket ID AMD® 604-1 based on silicon type of PortId_01 AMD® 204-1 in FIG. 2 and silicon ID of CON-A 1 304-1 in FIG. 3. In header section 602a, table size of the chipset configuration descriptor 600 is 26436 bytes which indicates the size of the chipset configuration descriptor 600, and the table signature of the chipset configuration descriptor 600 is 926040356 608-1 which indicates the identification of the chipset configuration descriptor 600.

At a process 770, the chipset is configured using the chipset configuration descriptor. In some embodiments, the chipset is configured during the initialization of the chipset. In some examples, the chipset configuration descriptor is sent to the chipset to initialize the chipset at run-time. In some examples, BIOS 104 sends the chipset configuration descriptor to the chipset via the API of the chipset.

As discussed above and further emphasized hereafter FIGS. 7-9 are merely examples which should not unduly limit the scope of the claims. According to some embodiments, methods 700-900 may be adapted to support partial matching between desired interface configurations and platform connector and port combinations. In some examples, process 850 may be adapted to record a value (e.g., between 0 and 1 inclusive) that indicates how well the platform connector and port combination matches to the desired features for the desired interface configuration. In some examples, the recorded value may correspond to a weighted score (e.g., a weighted sum and/or some other aggregation) of which of the features evaluated during process 840 and method 900 are supported by platform connector and port combination. In some examples, when each of the features is supported, the weighted score would indicate that the desired interface configuration is fully supported (e.g., by an entry of 1) by the platform connector and port combination. In some examples, the weights for each of the features may be selected based on the priority and/or importance of that feature to the desired interface configuration (e.g., the hotplugging requirement may have a lower weight than the power requirement when the hotplugging requirement is of less importance for that desired interface configuration). Therefore, in the adapted process 850, each of the corresponding cells in a desired interface configuration versus platform connector and port combinations table (e.g., table 500 in FIG. 5) are filled out with the weighted scores of the features evaluated during process 840 and method 900 instead of True and False notations.

In some examples, one or more features and requirements may be considered essential for a desired interface configuration. Thus, in some examples when one or more essential features and requirements are not supported by a platform connector and port combination, the weighted score of the platform and port connector pair is forced to zero.

Additionally, process 750 may be adapted to choose a platform connector and port combination candidate for each of the desired interface configurations such that a total of the weighed scores of the assigned platform connector and port combinations for every desired interface configurations has the highest total with respect to other totals of weighed scores for different assignments of the platform and port connector pairs to the desired interface configurations.

In some examples, the selection based on the highest total of the weighed scores of the platform connector and port combinations assigned to the desired interface configurations, may not result in the assignment of every desired interface configuration. Thus, process 750 may be further adapted to choose the platform connector and port combination combinations so that each of the desired interface configures is assigned to a platform and port connector pair that has a non-zero weighted score even if that does not result in the highest total among the weighted scores According to some embodiments, method 700 may be adapted to support grouping of two or more desired interface configurations for assignment to a same platform connector and port combination and/or splitting a desired interface configuration and assigning it to two or more platform connector and port combination.

In some embodiments, method 700 may include an additional process before process 750, to determine whether each pair of desired interface configurations may be grouped into a single desired interface configuration. In some examples, a pair of two desired interface configurations may be grouped into a single desired interface configuration when each of the desired interface configurations in the pair have the same features and requirements (e.g., port type, hotplugging, bifurcation, and/or the like), the number of lanes in the pair is less than or equal to the maximum number of lanes allowed to be grouped, and the combined power requirements of the pair is supported at least by one platform connector and port combination. When it is determined that the pair of desired interface configurations can be grouped, the two desired interface configurations in the pair are removed and then replaced by a single desired interface configuration with the same features and a total number of lanes for the pair and a total power for the pair. The new desired interface configuration is then checked against the other desired interface configurations to see if it can be further grouped.

In some examples, the two desired interface configurations in a pair may still be grouped even when they do not have the same features and requirements. For example, for features such as hotplugging support, a desired interface configuration that doesn't require hotplugging support may be grouped with a desired interface configuration that does require hotplugging support as long as the desired interface configuration after the grouping indicates that hotplugging should be supported for that desired interface configuration.

In some embodiments, method 700 may include an additional process before process 750, to determine whether a desired interface configuration should be split into two desired interface configurations. In some examples, when a desired interface configuration has more lanes than the number of lanes available in any of the platform connector and port combinations, the desired interface configuration is split into two desired interface configurations with the same features and requirements as the desired interface configuration being split except that the number of lanes is split between the two new desired interface configurations. In some examples, the power requirements of the two new desired interface configurations may also be prorated based on the number of lanes placed in the two new desired interface configurations.

In some examples, the number of lanes of the desired interface configuration may be split into the two new desired interface configurations based on a default size, the number of lanes supported by the chipset port and/or the platform connector supporting the fewest number of lanes, and/or the like. For example, if a desired interface configuration has 20 lanes, and the largest number of lanes is 16, the two new desired interface configurations may be assigned 16 and 4 lanes, respectively.

Some examples of computing units, such as computing unit 100, may include non-transitory, tangible, machine-readable media that include executable code that when run by one or more processors (e.g., processor 102) may cause the one or more processors to perform the processes of methods 700-900. Some common forms of machine-readable media that may include the processes of methods 700-900 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change, and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A chipset configuration descriptor generation system, comprising:
    a chipset including a plurality of chipset ports;
    a plurality of endpoint devices;
    a respective platform connector connected to each of the plurality of chipset ports to provide a plurality of chipset port/platform connector combinations that each provide a link to at least one of the plurality of endpoint devices; and
    a chipset port configuration generation subsystem that is coupled to the chipset and that is configured, during first initialization operations, to:
        determine a respective first port configuration for each of the plurality of chipset ports based on 1) a plurality of first desired interface properties for the link provided to the at least one of the plurality of endpoint devices connected to the chipset port/platform connector combination that includes that chipset port, and 2) capabilities of each of that chipset port and the respective platform connector connected to that chipset port;
        generate a first chipset configuration descriptor using the respective first port configurations; and
        configure the plurality of chipset ports using the first chipset port configuration descriptor.

2. The system of claim 1, wherein the chipset port configuration generation subsystem is provided by a Basic Input Output System (BIOS).

3. The system of claim 1, wherein the determining the respective first port configuration for each of the plurality of chipset ports includes:
    determining a number of the plurality of endpoint devices connected via the respective platform connector to that chipset port; and
    bifurcating that chipset port based on the number of the plurality of endpoint devices connected via the respective platform connector to that chipset port.

4. The system of claim 1, wherein the respective first port configuration for each of the plurality of chipset ports is selected from chipset capability information that is included in the chipset port configuration generation subsystem and that identifies the capabilities of each of the plurality of chipset ports.

5. The system of claim 1, wherein the respective first port configuration for each of the plurality of chipset ports includes at least one of a hotplug configuration, a power configuration, a lane configuration, and a bifurcation configuration.

6. The system of claim 1, wherein the chipset port configuration generation subsystem is configured, during second initialization operations, to:
    determine a respective second port configuration for each of the plurality of chipset ports based on 1) a plurality of second desired interface properties for the link provided to the at least one of the plurality of endpoint devices connected to the chipset port/platform connector combination that includes that chipset port, and 2) capabilities of each of that chipset port and the respective platform connector connected to that chipset port, wherein at least one of the respective second port configurations is different than at least one of the respective first port configurations;
    generate a second chipset configuration descriptor using the respective second port configurations, wherein the second chipset configuration descriptor is different than the first chipset configuration descriptor; and
    configure the plurality of chipset ports using the second chipset port configuration descriptor.

7. An Information Handling System (IHS), comprising:
    a processing system; and
    a memory system that includes instructions that, when executed by the processing system, cause the processing system to provide a chipset port configuration generation engine that is configured, during first initialization operations, to:
        determine a respective first port configuration for each of a plurality of chipset ports on a chipset that is coupled to the processing system based on 1) a plurality of first desired interface properties for a link provided to at least one of a plurality of endpoint devices connected to a chipset port/platform connector combination that includes that chipset port and a respective platform connector, and 2) capabilities of each of that chipset port and the respective platform connector connected to that chipset port;
        generate a first chipset configuration descriptor using the respective first port configurations; and
        configure the plurality of chipset ports using the first chipset port configuration descriptor.

8. The IHS of claim 7, wherein the chipset port configuration generation engine is provided by a Basic Input Output System (BIOS).

9. The IHS of claim 7, wherein the determining the respective first port configuration for each of the plurality of chipset ports includes:
    determining a number of the plurality of endpoint devices connected via the respective platform connector to that chipset port; and
    bifurcating that chipset port based on the number of the plurality of endpoint devices connected via the respective platform connector to that chipset port.

10. The IHS of claim 7, wherein the respective first port configuration for each of the plurality of chipset ports is selected from chipset capability information that is included in the chipset port configuration generation engine and that identifies the capabilities of each of the plurality of chipset ports.

11. The IHS of claim 7, wherein the respective first port configuration for each of the plurality of chipset ports includes at least one of a hotplug configuration, a power configuration, a lane configuration, and a bifurcation configuration.

12. The IHS of claim 7, wherein the chipset port configuration generation engine is configured, during second initialization operations, to:
   determine a respective second port configuration for each of the plurality of chipset ports based on 1) a plurality of second desired interface properties for the link provided to the at least one of the plurality of endpoint devices provided to the at least one of the plurality of endpoint devices connected to the chip set port/platform connector combination that includes that chipset port, and 2) capabilities of each of that chipset port and the respective platform connector connected to that chipset port, wherein at least one of the respective second port configurations is different than at least one of the respective first port configurations;
   generate a second chipset configuration descriptor using the respective second port configurations, wherein the second chipset configuration descriptor is different than the first chipset configuration descriptor; and
   configure the plurality of chipset ports using the second chipset port configuration descriptor.

13. The IHS of claim 12, wherein the at least one of the respective second port configurations is different than the at least one of the respective first port configurations based on a change in the connection of the at least one of the plurality of endpoint devices to at least one of the chipset ports/platform connector combinations.

14. A method for generating a chipset configuration descriptor, comprising:
   determining, by a chipset port configuration generation subsystem during first initialization operations, a respective first port configuration for each of a plurality of chipset ports on a chipset based on 1) a plurality of first desired interface properties for a link provided to at least one of a plurality of endpoint devices connected to a chipset port/platform connector combination that includes that chipset port and a respective platform connector, and 2) capabilities of each of that chipset port and the respective platform connector connected to that chipset port;
   generating, by the chipset port configuration generation subsystem during the first initialization operations, a first chipset configuration descriptor using the respective first port configurations; and
   configuring, by the chipset port configuration generation subsystem during the first initialization operations, the plurality of chipset ports using the first chipset port configuration descriptor.

15. The method of claim 14, wherein the chipset port configuration generation subsystem is provided by a Basic Input Output System (BIOS).

16. The method of claim 14, wherein the determining the respective first port configuration for each of the plurality of chipset ports includes:
   determining, by the chipset port configuration generation subsystem during the first initialization operations, a number of the plurality of endpoint devices connected via the respective platform connector to that chipset port; and
   bifurcating, by the chipset port configuration generation subsystem during the first initialization operations, that chipset port based on the number of the plurality of endpoint devices connected via the respective platform connector to that chipset port.

17. The method of claim 14, wherein the respective first port configuration for each of the plurality of chipset ports is selected from chipset capability information that is included in the chipset port configuration generation subsystem and that identifies the capabilities of each of the plurality of chipset ports.

18. The method of claim 14, wherein the respective first port configuration for each of the plurality of chipset ports includes at least one of a hotplug configuration, a power configuration, a lane configuration, and a bifurcation configuration.

19. The method of claim 14, further comprising:
   determining, by the chipset port configuration generation subsystem during second initialization operations, a respective second port configuration for each of the plurality of chipset ports based on 1) a plurality of second desired interface properties for the link provided to the at least one of the plurality of endpoint devices provided to the at least one of the plurality of endpoint devices connected to the chipset port/platform connector combination that includes that chipset port, and 2) capabilities of each of that chipset port and the respective platform connector connected to that chipset port, wherein at least one of the respective second port configurations is different than at least one of the respective first port configurations;
   generating, by the chipset port configuration generation subsystem during second initialization operations, a second chipset configuration descriptor using the respective second port configurations, wherein the second chip set configuration descriptor is different than the first chipset configuration descriptor; and
   configuring, by the chipset port configuration generation subsystem during second initialization operations, the plurality of chipset ports using the second chipset port configuration descriptor.

20. The method of claim 19, wherein the at least one of the respective second port configurations is different than the at least one of the respective first port configurations based on a change in the connection of the at least one of the plurality of endpoint devices to at least one of the chipset port/platform connector combinations.

* * * * *